May 8, 1951     A. B. SIMMONS ET AL     2,552,225
NEGATIVE CARRIER
Filed March 26, 1948
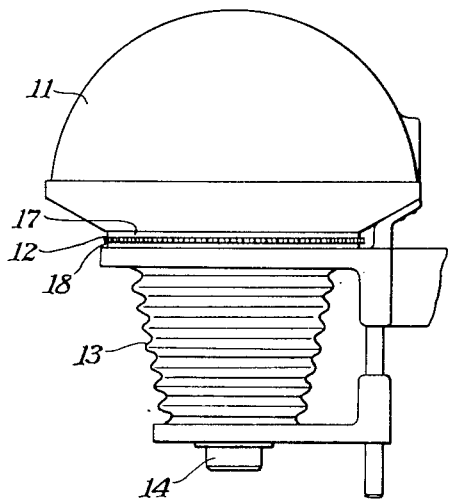
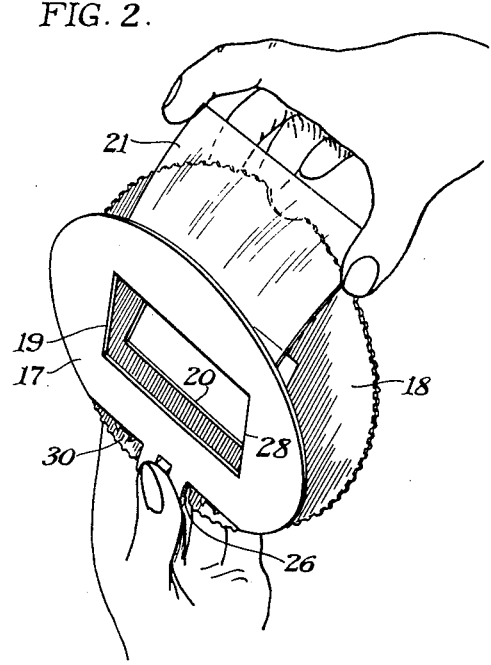
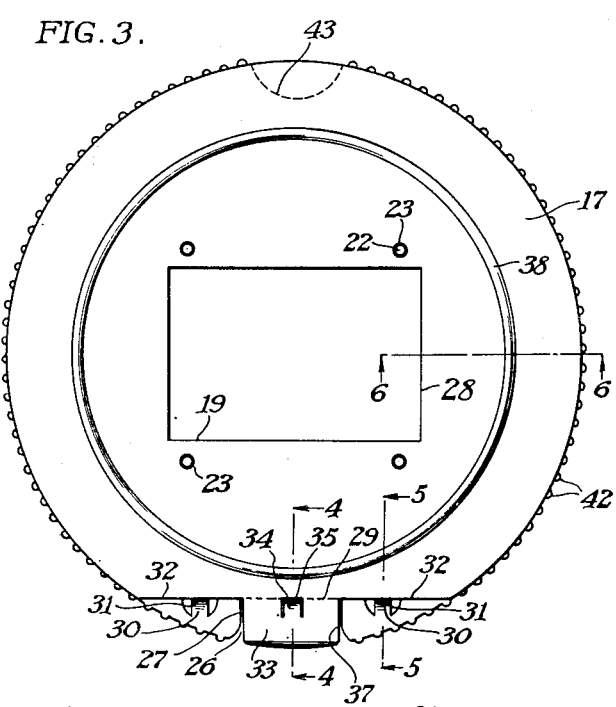
ARTHUR B. SIMMONS
JOHN H. EAGLE
INVENTORS
BY Newton M. Curzios
J. Griffin Little
ATTORNEYS Patented May 8, 1951

2,552,225

UNITED STATES PATENT OFFICE 2,552,225

NEGATIVE CARRIER

Arthur B. Simmons and John H. Eagle, Rochester, N. Y., assignors to Eastman Kodak Company, Rochester, N. Y., a corporation of New Jersey Application March 26, 1948, Serial No. 17,226

10 Claims. (Cl. 88—24)

The present invention relates to photographic enlargers, and more particularly to a negative holder or carrier therefor.

The principal object of the invention is the provision of a simple and novel hinge construction for the negative carrier.

Another object of the invention is a hinge construction which pivotly connects the carrier parts, yet enables the parts to be readily and easily disconnected when desired.

Still another object of the invention is the provision of a hinge construction of the type described which also assists in retaining the parts in proper assembled relation.

Yet another object of the invention is the provision of a carrier formed to cooperate with parts of the enlarger to permit rotation of the carrier relative to the enlarger to position or orient the negative relative thereto.

To these and other ends, the invention resides in certain improvements and combinations of parts, all as will be hereinafter more fully described, the novel features being pointed out in the claims at the end of the specification.

In the drawings:

Fig. 1 is an elevation view of an enlarger, showing the relation thereto of a negative holder or carrier constructed in accordance with the present invention;

Fig. 2 is a perspective view of the carrier of present invention, detached from the enlarger, showing the carrier in open position to receive a single film area;

Fig. 3 is a plan view of the carrier, showing the novel hinge construction of the present invention;

Fig. 4 is a partial sectional view through the carrier illustrated in Fig. 3, and taken substantially on line 4—4 thereof, showing a portion of the hinge construction and one of the positioning members;

Fig. 5 is a partial sectional view through the carrier and taken substantially on line 5—5 of Fig. 3, showing another part of the hinge construction; and Fig. 6 is a vertical sectional view through a portion of the carrier and the adjacent parts of the enlarger, showing the arrangement of the parts which guide the carrier during the rotation thereof in the enlarger and also to form the desired light lock between the enlarger and the negative carrier.

Similar reference numerals throughout the various views indicate the same parts.

The negative carrier or holder of the present invention is adapted for use on a wide range of enlarger constructions. For example, the enlarger may comprise, in general, a lamphouse 11 positioned above the negative carrier, broadly designated by the numeral 12, and an extensible bellows 13 connecting the negative carrier to the projection lens 14. As the enlarger may be of any suitable or well known construction and does not constitute a part of the present invention, except as later pointed out, further details are not illustrated or described as they are not deemed necessary to a complete understanding of the present invention.

The negative carrier or holder 12 of the present invention comprises a pair of flat round plates 17 and 18 of metal or other sheet material formed with apertures 19 and 20, respectively, which are adapted to frame the image area of the film, as is well known. This carrier is adapted for use with a single negative, as shown at 21, Fig. 2, or with image areas arranged in strip form. In order to position the strip film laterally in the carrier, the lower plate 17 is provided with a plurality of, in the present instance four, positioning pins 22 which project upwardly from the lower plate 18 and are arranged adjacent to the aperture 20 and are adapted to engage the opposite marginal edges of the film strip, not shown. These pins register with and extend into aligned openings 23 formed in the upper plate 17. In addition to edge guiding the film strip, the pins 22 cooperate with the holes 23 to retain the plates 17 and 18 in proper position with the apertures 19 and 20 in registration, as is believed apparent from an inspection of Fig. 3.

When the carrier is in closed condition, as shown in Figs. 4 to 6, the plates 17 and 18 are in substantial contact and serve to clamp a negative therebetween with the image area of the negative in registry with and framed by the apertures 19 and 20. However, in order to place a separate image area 21 in position between the plates or to move a film strip therethrough, it is desirable or necessary to separate the plates to facilitate said opening. The present invention provides a novel hinge construction which pivotly or hingedly connects the plates to permit the latter to be opened as shown in Fig. 2 to permit the placing or positioning a film area 21 therebetween. While the hinge construction pivotly connects the plates, the hinged parts are readily separable so as to permit quick and easy separation of the plates when the carrier is removed from the enlarger. Also, the hinge construction is such as to lend itself to punch-press operation to reduce the cost of the hinge construction and to enable the easy and quick assembling thereof even by unskilled help.

To this end, the lower plate 18 is formed with a marginal open-end slot 26, the sides 27 of which are spaced and substantially parallel to the short sides 28 of the plate apertures, see Fig. 3. The slot is formed with a bottom edge 29 which extends normal to and connects the sides 27. The bottom plate 18 has struck up therefrom a pair of lugs 30 positioned on opposite sides of slot 26 and with the free end 31 of the lugs in alignment with the bottom edge 29, as clearly illustrated in Figs. 3 and 4. The upper plate 17, on the other hand, is provided with aligned edges 32 adapted to engage a free end 31 of the lugs 30, see Fig. 4, and a tongue 33 which projects over the slot 26. In addition, the tongue has formed therefrom a down-struck lug 34, the free end 35 of which engages the bottom 29 of the slot 26. Thus, when the parts are assembled, the free ends 31 of the lugs 30 on the lower plate 18 engage the edges 32 of the plate 17, while the free end 35 of the lug 34 on tongue 33 engages the bottom 29 of the slot 26. The edges and the lugs are in alignment and thus cooperate to provide a hinge about which two plates 17 and 18 may be moved relative to each other, as shown in Fig. 2, to separate the plates. Such lugs and edges may be readily formed in a punch press without necessitating subsequent assembly work. Furthermore, as the hinge parts are not connected positively, the plates may be readily and easily disconnected if and when desired.

It will be apparent from an inspection of Fig. 3 that if the upper plate 17 is shifted upwardly relative to the lower plate, the lug 34 will be brought into abutting engagement with the bottom 29 to limit or arrest such movement. On the other hand, a downward movement of the plate 17, as viewed in Fig. 3, will serve to bring the edges 32 into abutting relation with the lugs 30 to limit such movement. Thus, in addition to affording a hinge construction, the axis of which is along the edges 29 and 32, the lugs and edges provide means for limiting movement of the plate in a direction normal to the hinge axis and in the plane thereof to position the plate to retain the apertures 19 and 20 in substantial registry.

The free end 36 of the tongue 33 is bent downwardly out of the plane of the upper plate 17 and into the slot 26 between the sides 27 thereof. Referring now to Fig. 3, it is apparent that a relative rotation of the plates 18 and 17, or a relative sideways movement thereof, will serve to bring one of the sides 37 of the tongue into contact with an adjacent side 27 of the slot 26 to limit such movement. Obviously, of course, the particular sides which engage will depend on the direction of movement. Thus, the tongue 33 and the sides 27 of slot 26 prevents or limits movement of the plates in a direction parallel to the hinge axis, as well as relative rotation between the carrier plates.

It is sometimes desirable to rotate or turn the negative carrier in the projector to orient the negative with relation to the paper easel. It is for this reason that the plates 17 and 18 are made round or circular. In addition, the upper plate 17 is formed with a bent-up annular flange or rib 38 which engages in and cooperates with a complementary shaped and sized recess 39 formed in the adjacent portion of the projector body. In addition, the lower plate 18 is formed with a depending annular flange or rib 40 which engages in and cooperates with an annular groove 41 in the enlarger, as best shown in Fig. 6. The ribs 38 and 40 thus cooperate with the recesses 39 and 41 to provide an annular guide by which the carrier may be rotated in the enlarger to orient the negative in any desired relation with the enlarger baseboard or easel while maintaining the center of the apertures 19 and 20 on the optical axis of the enlarger, the advantages of which are believed apparent. This rib-and-groove arrangement also provides the desired light lock between the enlarger housing and the negative carrier.

To facilitate turning or rotating the carrier, the edge of the lower plate 18 is roughened or serrated as shown in 42. Also, in order to facilitate opening of the plates, the lower plate is provided with a cut-out portion 43 to provide a thumb-hole by which the upper plate may be engaged and raised to separate the plates. This separation may be done while the carrier is within the carrier gate, in which case the lifting of the upper plate will raise the lamphouse slightly to permit separation of the plates. However, as this feature is not part of the present invention, it is not illustrated or described.

The present invention thus provides a negative carrier of the so-called "book" type having a new and simple hinge construction the principal feature of which is that the hinge action is obtained by means of a lug or lugs struck up from the material of one carrier plate, and cooperating in inter-locking relation against straight edges of the opposite plate. Also, a very slight relative movement of the plates in a direction normal to the hinge axis and in the plane thereof will bring certain lugs and edges into play to limit such movement to position the plates in correct operating relation. A tongue in the upper member on the other hand, cooperates with edges of a slot in the lower member to limit relative rotation movement of the plates or relative movement in a direction parallel to the hinge axis. Thus, the plates are effectively hingedly connected by a single hinge, the parts of which may be readily and easily separated or disconnected when desired.

While one embodiment of the invention has been disclosed, it is to be understood that the inventive idea may be carried out in a number of ways. This application is, therefore, not to be limited to the precise details described, but is intended to cover all variations and modifications thereof which fall within the scope of the appended claims.

We claim:

1. A negative holder for use in a projector comprising, in combination, a pair of flat apertured plates between which a negative is adapted to be positioned, a pair of spaced lugs struck up from and projecting out of the plane of one of said plates, an edge formed on said one plate in alignment with the free ends of said lugs, a lug struck up from the other of said plates and positioned so that the free end thereof will engage said edge of said one plate, and a pair of edges on said other plate arranged in alignment with second lug and said pair of lugs and adapted to be engaged by the latter, said lugs and edges providing a completely separable hinge for pivotally connecting the plates.

2. A negative holder for use in a projector comprising, in combination, a pair of flat apertured plates between which a negative is adapted to be positioned, a pair of spaced lugs struck up from and projecting out of the plane of one of said plates, an edge formed on said one plate between and in alignment with the free ends of said lugs, a lug struck up from the other of said plates and positioned between said pair of lugs and engaging said edge, and a pair of edges formed on said other plate on opposite sides of said second lug and in alignment therewith and engageable by said pair of lugs, said lugs and edges provide a separable hinge about which said plates may be pivoted to permit separation of said plates.

3. A negative holder for use in a projector comprising, in combination, a pair of flat apertured plates between which a negative is adapted to be positioned, a pair of spaced lugs struck up from and projecting out of the plane of one of said plates, an edge formed on said one plate between and in alignment with the free ends of said lugs, a lug struck up from the other of said plates and positioned between said pair of lugs and engaging said edge, a pair of edges formed on said other plate on opposite sides of said second lug and in alignment therewith and engageable by said pair of lugs, said lugs and edges provide a separable hinge about which said plates may be pivoted to permit separation of said plates, said lugs and edges serving alone to retain the plates against relative movement in a direction normal to said edges, and cooperating shoulders on said plates for retaining the latter against relative movement in a direction parallel to said edges.

4. A negative holder for use in a projector comprising, in combination, a pair of flat apertured plates between which a negative is adapted to be positioned, a pair of spaced lugs struck up from and projecting out of the plane of one of said plates, a marginal slot formed in said one plate between said lugs, an edge on said slot positioned in alignment with the free ends of said lugs, a tongue formed on said other plate overlying said slot, a lug struck up from said tongue and bent out of the plane thereof to engage said edge, a pair of edges formed on said other plate positioned on opposite sides of said tongue and in alignment with said pair of lugs so as to be engaged thereby, said lugs and edges being in alignment to provide separable hinge members for pivotally connecting said plates, said lugs and edges also serving to retain the plates against relative movement in a direction normal to said edges, and portions on said tongue adapted to engage said sides of said slot to hold said plates against relative movement in a direction parallel to said edges.

5. A negative holder for use in a projector comprising, in combination, a pair of flat apertured plates between which a negative is adapted to be positioned, a pair of spaced lugs struck up from and projecting out of the plane of one of said plates, a marginal slot formed in said one plate between said lugs, an edge on said slot positioned in alignment with the free ends of said lugs, a tongue formed on said other plate overlying said slot, a lug struck up from said tongue and bent out of the plane thereof to engage said edge, a pair of edges formed on said other plate positioned on opposite sides of said tongue and in alignment with said pair of lugs so as to be engaged thereby, said lugs and edges being in alignment to provide separable hinge members for pivotally connecting said plates, said lugs and edges also serving to retain the plates against relative movement in a direction normal to said edges, said tongue having the free end thereof bent out of the plane of said other plate and projecting into said slot, and sides on said free end adapted to engage sides of said slot to prevent relative movement of said plates in a direction parallel to said edges.

6. A negative holder for use in a projector comprising, in combination, a pair of flat apertured plates between which a negative is adapted to be positioned, each of said plates being formed with members which cooperate with complementary members of the other plate to provide a separable hinge for connecting said members releasably, and an annular rib formed on or at least one of said members and cooperating with a similarly shaped groove in said projector to permit said holder to be rotated in said projector to position said negative relative thereto.

7. A negative holder for use in a projector comprising, in combination, an upper flat apertured plate and a lower flat apertured plate, an annular upstanding rib formed on said upper plate and a depending annular rib formed on said lower plate, said ribs being positioned outside said apertures and adapted to cooperate with complementary and similarly shaped recesses formed in said projector to permit rotation of said holder on said projector to position said negative.

8. A negative holder for use in a projector comprising, in combination, an upper flat apertured plate and a lower flat apertured plate, and oppositely projecting annular ribs formed on said plates and adapted to be received in similarly shaped recesses on said projector to mount said holder on said projector for rotation thereon to position the negative in proper relation to said projector, said ribs and recesses also affording a light lock between said negative and holder.

9. A negative holder for use in a projector comprising, in combination, an upper flat apertured plate and a lower flat apertured plate, an annular upstanding rib formed on said upper plate, a depending annular rib formed on said lower plate, said ribs being positioned outside said apertures and adapted to cooperate with complementary and similarly shaped recesses formed in said projector to permit rotation of said holder on said projector to position said negative, and cooperating lugs and edges formed on said plates to provide separable hinge members which pivotally connect said plates.

10. A negative holder for use in a projector comprising, in combination, an upper flat apertured plate and a lower flat apertured plate, an annular upstanding rib formed on said upper plate, a depending annular rib formed on said lower plate, said ribs being positioned outside said apertures and adapted to cooperate with complementary and similarly shaped recesses formed in said projector to permit rotation of said holder on said projector to position said negative, a pair of spaced lugs formed on one of said plates, an edge on said plate in alignment with said lugs, a lug on the other plate adapted to engage said edge, and a pair of edges on said other plate in alignment with said pair of lugs and adapted to be engaged thereby, said lugs and edges comprising separable hinge members which pivotally connect said plates.

ARTHUR B. SIMMONS.
JOHN H. EAGLE.

REFERENCES CITED

The following references are of record in the file of this patent:

UNITED STATES PATENTS

| Number | Name | Date |
| --- | --- | --- |
| 2,191,036 | Seymour | Feb. 20, 1940 |
| 2,249,228 | Rogers | July 15, 1941 |
| 2,353,241 | Hughey | July 11, 1944 |